US011913473B2

(12) United States Patent
Chavez Castellanos et al.

(10) Patent No.: US 11,913,473 B2
(45) Date of Patent: Feb. 27, 2024

(54) COMPRESSOR WITH ELECTRIC MOTOR COOLANT JACKET HAVING RADIAL AND AXIAL PORTIONS

(71) Applicant: Garrett Transportation I Inc, Torrance, CA (US)

(72) Inventors: Carlos Chavez Castellanos, Rolling Hill Estates, CA (US); Adonis Spathias, Glendora, CA (US); Manuel Gonzalez, Los Angeles, CA (US)

(73) Assignee: GARRETT TRANSPORTATION I INC, Torrance, CA (US)

(*) Notice: Subject to any disclaimer, the term of this patent is extended or adjusted under 35 U.S.C. 154(b) by 194 days.

(21) Appl. No.: 17/198,569

(22) Filed: Mar. 11, 2021

(65) Prior Publication Data

US 2021/0293254 A1 Sep. 23, 2021

Related U.S. Application Data

(63) Continuation-in-part of application No. 16/820,861, filed on Mar. 17, 2020, now Pat. No. 11,359,645.

(51) Int. Cl.
| | |
|---|---|
| *F04D 29/58* | (2006.01) |
| *F04D 13/06* | (2006.01) |
| *F04D 25/06* | (2006.01) |
| *F04D 29/62* | (2006.01) |
| *H02K 5/20* | (2006.01) |
| *H02K 9/197* | (2006.01) |

(52) U.S. Cl.
CPC .......... *F04D 29/584* (2013.01); *F04D 13/06* (2013.01); *F04D 29/5806* (2013.01); *F04D 29/628* (2013.01); *H02K 5/203* (2021.01); *F04D 25/0606* (2013.01); *H02K 9/197* (2013.01)

(58) Field of Classification Search
CPC .. F04D 29/5866; F04D 13/06; F04D 29/4293; F04D 29/5806; F04D 29/584; F04D 29/628; F04D 25/0606; H02K 5/203; H02K 5/20; H02K 9/19; H02K 9/197
See application file for complete search history.

(56) References Cited

U.S. PATENT DOCUMENTS

| | | | | |
|---|---|---|---|---|
| 3,060,335 A | * | 10/1962 | Greenwald | ............ H02K 5/203 310/58 |
| 4,297,784 A | | 11/1981 | Vagman | |
| 6,909,210 B1 | * | 6/2005 | Bostwick | ............... H02K 5/203 310/58 |

(Continued)

FOREIGN PATENT DOCUMENTS

| | | |
|---|---|---|
| CN | 202260662 U | 5/2012 |
| CN | 102857047 B | 5/2015 |

(Continued)

*Primary Examiner* — Kenneth J Hansen
*Assistant Examiner* — David N Brandt
(74) *Attorney, Agent, or Firm* — LORENZ & KOPF, LLP

(57) ABSTRACT

A compressor device includes a coolant jacket cooperatively defined by a motor case and an outer motor housing. The coolant jacket includes a radial portion that spans about the motor case in a circumferential direction and an axial direction with respect to the axis of rotation of the motor. The coolant jacket includes an axial portion that spans in a radial direction across an axial end of the motor case. At least one of the plurality of flow passages fluidly connects the radial portion and the axial portion.

20 Claims, 8 Drawing Sheets

(56) References Cited

U.S. PATENT DOCUMENTS

| | | |
|---|---|---|
| 6,964,250 B2 | 11/2005 | Wierl et al. |
| 7,038,343 B2 | 5/2006 | Agnes et al. |
| 7,767,105 B2 | 8/2010 | Uetsuji et al. |
| 8,215,014 B2 | 7/2012 | Amburgey et al. |
| 9,130,421 B2 | 9/2015 | Chamberlin et al. |
| 9,287,755 B2 | 3/2016 | Woolmer et al. |
| 9,416,780 B2 | 8/2016 | Steele |
| 9,450,468 B2 | 9/2016 | Chamberlin et al. |
| 10,069,388 B2 | 9/2018 | Court et al. |
| 10,844,779 B2 | 11/2020 | Hehn et al. |
| 2006/0045735 A1 | 3/2006 | Holdik et al. |
| 2008/0199326 A1* | 8/2008 | Masoudipour ...... F04D 29/0513 417/247 |
| 2011/0150637 A1 | 6/2011 | Radermacher et al. |
| 2014/0246177 A1* | 9/2014 | Chamberlin ........... H02K 5/203 165/104.33 |
| 2014/0246932 A1 | 9/2014 | Chamberlin |
| 2014/0265661 A1 | 9/2014 | Chamberlin et al. |
| 2014/0354090 A1 | 12/2014 | Chamberlin |
| 2015/0308456 A1 | 10/2015 | Thompson et al. |
| 2016/0028292 A1 | 1/2016 | Lin et al. |
| 2018/0358849 A1 | 12/2018 | Saint-Michel et al. |
| 2019/0345956 A1 | 11/2019 | Iizuka et al. |

FOREIGN PATENT DOCUMENTS

| | | |
|---|---|---|
| CN | 204511977 U | 7/2015 |
| CN | 109365633 A | 2/2019 |
| DE | 202005008264 U1 | 9/2005 |
| DE | 102018201162 A1 | 7/2019 |
| EP | 0655824 B1 | 5/1995 |
| EP | 3623597 A1 | 3/2020 |
| KR | 19980017579 U | 7/1998 |
| WO | 2004055956 A2 | 7/2004 |
| WO | 2013187786 A1 | 12/2013 |
| WO | 2018139497 A1 | 8/2018 |
| WO | 2019087868 A1 | 5/2019 |

* cited by examiner

COMPRESSOR WITH ELECTRIC MOTOR COOLANT JACKET HAVING RADIAL AND AXIAL PORTIONS

CROSS REFERENCE TO RELATED APPLICATION

The following is a continuation-in-part of U.S. patent application Ser. No. 16/820,861, filed Mar. 17, 2020, which is incorporated by reference herein in its entirety.

TECHNICAL FIELD

The present disclosure generally relates to a compressor and, more particularly, relates to a compressor with a cooled air passage and a liquid coolant passage that are arranged in an axial heat exchanger arrangement. The present disclosure also relates to a compressor with an electric motor coolant jacket having radial and axial portions.

BACKGROUND

Various systems include a compressor for supplying a compressed fluid. For example, fuel cell systems often include a fuel cell compressor for compressing air before it is fed to the fuel cell stack. This can increase operating efficiency of the fuel cell system.

However, conventional compressors may suffer from various deficiencies. In the case of an electric compressor device, a cooling system may be provided that directs flow of a coolant through the device to maintain operating temperatures of the motor and/or other components within a predetermined range. Some compressors may include bearings that are fluid-cooled. Cooling the bearing(s), the motor, and/or other components of the compressor device may prove challenging, leading to inefficient operation and/or premature wear. Additionally, cooling systems within conventional compressors may be bulky. Furthermore, manufacture of these compressors may be expensive and inefficient.

Thus, it is desirable to provide a compressor with a bearing cooling system that provides improved cooling performance. It is further desirable for the bearing, motor, cooling system, and other associated components to be highly compact and manufacturable. Other desirable features and characteristics of the present disclosure will become apparent from the subsequent detailed description and the appended claims, taken in conjunction with the accompanying drawings and this background discussion.

BRIEF SUMMARY

In one embodiment, a compressor device is disclosed that includes a housing, a rotating group with a compressor wheel, and a bearing that supports rotation of the rotating group within the housing about an axis of rotation. The compressor device also includes a motor that drives rotation of the rotating group about the axis of rotation. Furthermore, the compressor device includes a motor cooling system that provides a first flow of a first fluid through the housing for cooling the motor. The motor cooling system includes a first fluid flow section at a first axial position. The first fluid flow section extends in a downstream direction radially with respect to the axis of rotation. Furthermore, the compressor device includes a bearing cooling system that provides a second flow of a second fluid through the housing for cooling the bearing. The bearing cooling system includes a second flow section at a second axial position that is spaced apart axially from the first axial position. The second flow section extends in a downstream direction radially with respect to the axis of rotation. Moreover, the first flow section and the second flow section are disposed in a heat exchanger arrangement configured to transfer heat between the second fluid and the first fluid.

In another embodiment, a method of manufacturing a compressor device is disclosed. The method includes housing a rotating group of the compressor device within a housing of the compressor device, wherein the rotating group includes a compressor wheel. The method also includes housing a motor of the compressor device in the housing, wherein the motor is configured to drive rotation of the rotating group about an axis of rotation. Moreover, the method includes supporting rotation of the rotating group within the housing about the axis of rotation with a bearing of the compressor device. Also, the method includes providing a motor cooling system that provides a first flow of a first fluid through the housing for cooling the motor. The motor cooling system includes a first fluid flow section at a first axial position. The first fluid flow section extends in a downstream direction radially with respect to the axis of rotation. The method further includes providing a bearing cooling system that provides a second flow of a second fluid through the housing for cooling the bearing. The bearing cooling system includes a second flow section at a second axial position that is spaced apart axially from the first axial position. The second flow section extends in a downstream direction radially with respect to the axis of rotation. The method additionally includes disposing the first flow section and the second flow section in a heat exchanger arrangement configured to transfer heat between the second fluid and the first fluid.

In a further embodiment, a compressor device includes a housing that includes a compressor housing, a motor housing, and an internal member, wherein the compressor housing has an inlet, a diffuser area, and a volute passage, and wherein the internal member has a diffuser portion proximate the diffuser area and a thrust bearing portion. The compressor device also includes a rotating group with a compressor wheel and a bearing that supports rotation of the rotating group within the housing about an axis of rotation. The compressor device further includes a motor that drives rotation of the rotating group about the axis of rotation such that the compressor wheel compresses air flowing from the inlet, through the diffuser area, and into the volute passage. Moreover, the compressor device includes a motor cooling system that provides a first flow of a liquid coolant through the motor housing for cooling the motor and partly through the internal member of the housing. The motor cooling system includes a first fluid flow section at a first axial position. The first fluid flow section extends in a downstream direction radially with respect to the axis of rotation. Furthermore, the compressor device includes a bearing cooling system that receives an amount of the air from the volute passage and provides a second flow of the air through the housing for cooling the bearing. The bearing cooling system includes a second flow section at a second axial position that is spaced apart axially from the first axial position. The second flow section extends in a downstream direction radially with respect to the axis of rotation. The first flow section and the second flow section are disposed in a heat exchanger arrangement configured to transfer heat from the air to the liquid coolant.

In an additional embodiment, a compressor device is disclosed. The compressor device includes a compressor section with a compressor wheel. The compressor device also includes a motor section with an electric motor that is encased by a motor case and an outer motor housing. The motor case is supported within the outer motor housing. The compressor device further includes a shaft that extends between the compressor wheel and the motor section. The shaft is configured to be driven in rotation about an axis by the electric motor to drivingly rotate the compressor wheel within the compressor section. The compressor device additionally includes a motor cooling system with an inlet, an outlet, and a coolant jacket defined between the motor case and the outer motor housing to jacket the electric motor. The inlet extends through the outer motor housing and is configured to feed a coolant fluid to the coolant jacket. The outlet extends through the outer motor housing and is configured to receive the coolant from the coolant jacket. The coolant jacket is configured to direct flow of the coolant fluid from the inlet to the outlet. The coolant jacket includes a plurality of flow passages configured to distribute flow of the coolant fluid about the motor case. The plurality of flow passages defines at least one diverging flow path and at least one converging flow path. The coolant jacket includes a radial portion that spans about the motor case in a circumferential direction and an axial direction with respect to the axis. The coolant jacket includes an axial portion that spans in a radial direction across an axial end of the motor case. At least one of the plurality of flow passages fluidly connects the radial portion and the axial portion.

In an additional embodiment, a method of manufacturing a compressor device is disclosed. The method includes providing a compressor section of the compressor device with a compressor wheel. The method also includes encasing an electric motor of a motor section of the compressor device with a motor case and supporting the motor case within an outer motor housing. Furthermore, the method includes extending a shaft between the compressor wheel and the motor section. The shaft is configured to be driven in rotation about an axis by the electric motor to drivingly rotate the compressor wheel within the compressor section. The method also includes defining a coolant jacket of a motor cooling system between the motor case and the outer motor housing to jacket the electric motor. The motor cooling system has an inlet and an outlet. The inlet extends through the outer motor housing and is configured to feed a coolant fluid to the coolant jacket. The outlet extends through the outer motor housing and is configured to receive the coolant from the coolant jacket. The coolant jacket is configured to direct flow of the coolant fluid from the inlet to the outlet. The coolant jacket includes a plurality of flow passages configured to distribute flow of the coolant fluid about the motor case. The plurality of flow passages defines at least one diverging flow path and at least one converging flow path. The coolant jacket includes a radial portion that spans about the motor case in a circumferential direction and an axial direction with respect to the axis. The coolant jacket includes an axial portion that spans in a radial direction across an axial end of the motor case. At least one of the plurality of flow passages fluidly connects the radial portion and the axial portion.

In a further embodiment, a compressor device is disclosed. The compressor device includes a compressor section with a compressor wheel. The compressor device includes a motor section with an electric motor that is encased by a motor case and an outer motor housing. The motor case is supported within the outer motor housing. The motor case includes a plurality of dams that project outward toward the outer motor housing. The compressor device also includes a shaft that extends between the compressor wheel and the motor section. The shaft is configured to be driven in rotation about an axis by the electric motor to drivingly rotate the compressor wheel within the compressor section. Additionally, the compressor device includes a motor cooling system with an inlet, an outlet, and a coolant jacket defined between the motor case and the outer motor housing to jacket the electric motor. The inlet extends through the outer motor housing and is configured to feed a coolant fluid to the coolant jacket. The outlet extends through the outer motor housing and is configured to receive the coolant from the coolant jacket. The coolant jacket is configured to direct flow of the coolant fluid from the inlet to the outlet. The plurality of dams divides the coolant jacket into a plurality of flow passages. The plurality of flow passages is configured to distribute flow of the coolant fluid about the motor case. The plurality of flow passages defines at least one diverging flow path and at least one converging flow path. The coolant jacket includes a radial portion that spans about the motor case in a circumferential direction and an axial direction with respect to the axis. The coolant jacket includes an axial portion that spans in a radial direction across an axial end of the motor case. The motor case includes a through-hole that fluidly connects the radial portion and the axial portion.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
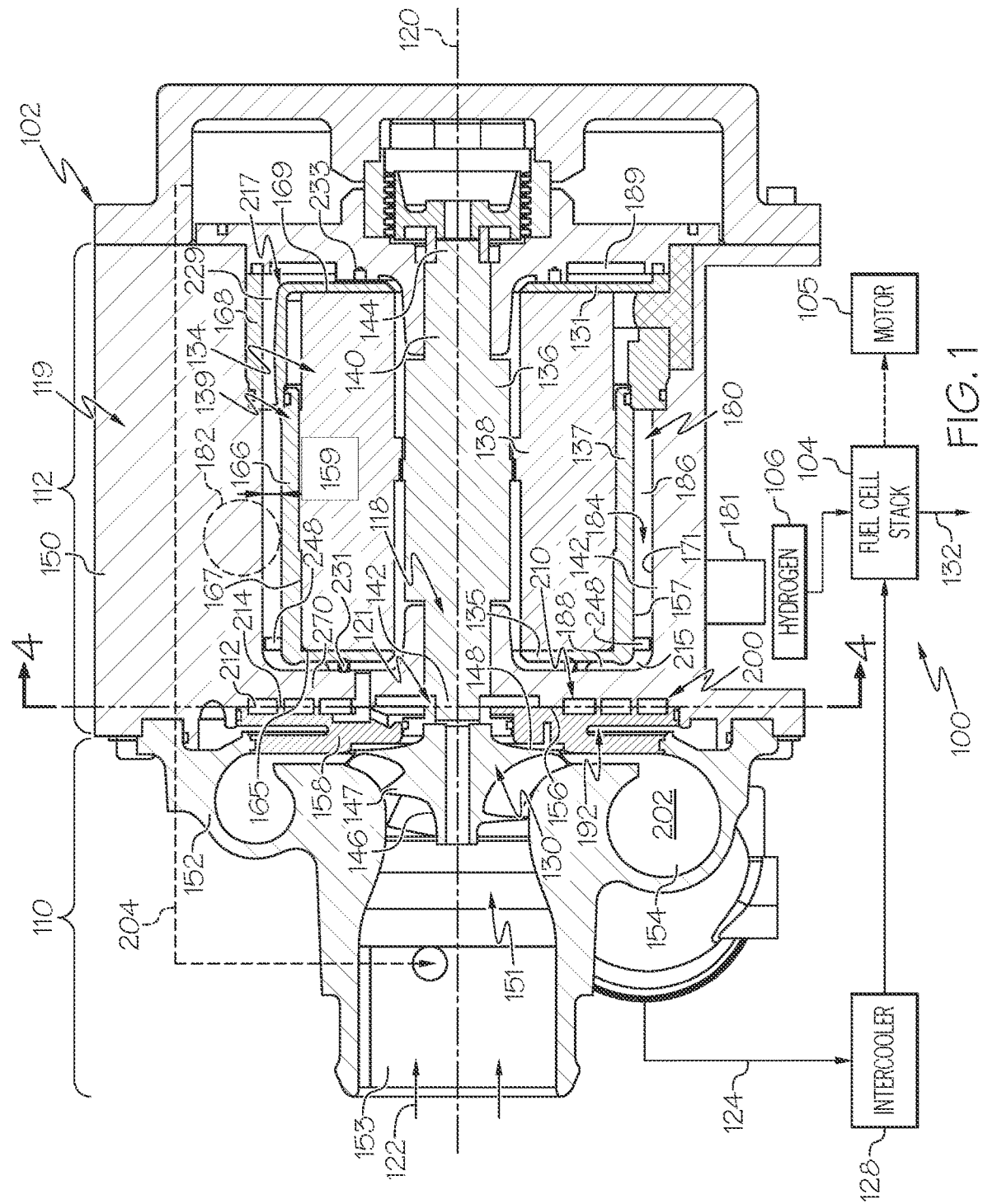
FIG. 1 is schematic view of a compressor device according to example embodiments of the present disclosure shown incorporated within a fuel cell system.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a compressor device, such as an e-charger or electric compressor. The compressor device may include a coolant jacket that jackets the electric motor. The coolant jacket may include portions that are disposed radially and axially with respect to the electric motor for enhanced cooling. In some embodiments, the compressor device may include a motor case that encases the electric motor, and an outer housing of the compressor device may receive and support the motor case. The coolant jacket may be cooperatively defined by and between the motor case and the outer housing. The coolant jacket may be subdivided into separate flow channels by one or more dams, flow dividers, walls, etc. These dams, flow dividers, walls, etc. may project from the motor case. The coolant jacket may include a plurality of flow passages that distribute flow of the coolant fluid about the motor case, creating convergent flow paths and/or divergent flow paths. The flow passages may also include a circumferential flow path that extends in a circumferential direction with respect to an axis of rotation of the compressor device, a radial flow path that extends generally radially with respect to the axis, a helical flow path that extends in a helical direction with respect to the axis, and/or an axial flow path that extends generally along the axis. As such, the coolant jacket may distribute flow about the motor for enhanced thermal performance. The flow may be directed in a tailored manner about a particular motor configuration for effective cooling thereof. Flow velocity, pressure, and/or other fluid parameters may be selected and the coolant jacket may be configured to provide these chosen fluid parameters of the coolant during operation. Flow may be controlled to provide beneficial thermal conditions for the compressor device. Therefore, the compressor device may be operated at high speeds and the motor cooling system may maintain temperatures at acceptable levels.

The compressor device may be compact and may have relatively low weight. Additionally, the compressor device of the present disclosure may be highly manufacturable.

Moreover, in some embodiments, the motor cooling system may be coupled with a bearing cooling system of the compressor device. In this regard, example embodiments disclosed herein include a compressor device, such as an e-charger or electric compressor, with a bearing cooling system that provides improved bearing cooling and, thus, improved operation and wear protection for the bearing of the compressor device. The compressor device is also compact and highly manufacturable. The bearing cooling system may be thermally coupled to the motor cooling system to thereby provide improved bearing cooling and, thus, improved operation and wear protection for the bearing of the compressor device.

More specifically, the compressor device may include a housing and a rotating group that rotates about an axis of rotation within the housing. The compressor device may include a bearing, such as an air bearing, that supports rotation of the rotating group within the housing. The compressor device may further include a motor, such as an electric motor, that drives rotation of the rotating group about the axis of rotation. Furthermore, the compressor device may include a motor cooling system through which a first coolant fluid flows to cool the motor. The compressor device may additionally include a bearing cooling system through which a second coolant fluid flows to cool the bearing. The motor cooling system and the bearing cooling system may include respective portions that are disposed together in a heat exchanger arrangement within the housing for transferring heat between the first and second fluids. In some embodiments, one or more flow sections of the motor cooling system may be disposed in a heat exchanger arrangement with one or more flow sections of the bearing cooling system, wherein the flow sections are spaced apart along the axis of the compressor device. In further embodiments, a flow section may be disposed between first and second flow sections of the motor cooling system with respect to the axis of rotation. The motor cooling system and the bearing cooling system may be configured such that heat is transferred from the second coolant fluid (of the bearing cooling system) to the first coolant fluid (of the motor cooling system) to cool the second coolant fluid. Ultimately, this may increase operating efficiency and provide wear protection for the compressor device.

Also, in some embodiments, one or more parts may define plural areas of the compressor device. For example, a single part may define at least a portion of the compressor flow passage (e.g., portions of a diffuser area and/or volute flow passage) and may also define portions that support the bearing of the compressor device. Furthermore, in some embodiments, this part may define portions of the bearing cooling system and/or the motor cooling system. These features can improve manufacturability, lower part count, and/or provide additional advantages.

Referring initially to FIG. 1, a compressor device 102 is shown according to example embodiments. The compressor device 102 may be an e-charger or electric motorized compressor device. Also, as shown, the compressor device 102 may be incorporated within a fuel cell system 100; however, it will be appreciated that the compressor device 102 may be incorporated in another system without departing from the scope of the present disclosure.

In some embodiments, the fuel cell system 100 may be included in a vehicle, such as a car, truck, sport utility vehicle, van, motorcycle, etc. However, it will be appreciated that the fuel cell system 100 may be configured for a different use without departing from the scope of the present disclosure.

The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. As stated, the fuel cell system 100 may be included in a vehicle; therefore, in some embodiments, the electric motor 105 may convert the electrical power to mechanical power to drive and rotate an axle (and, thus, one or more wheels) of the vehicle. Oxygen may be provided to the fuel cell stack 104, at least in part, by the compressor device 102.

Figure 2:
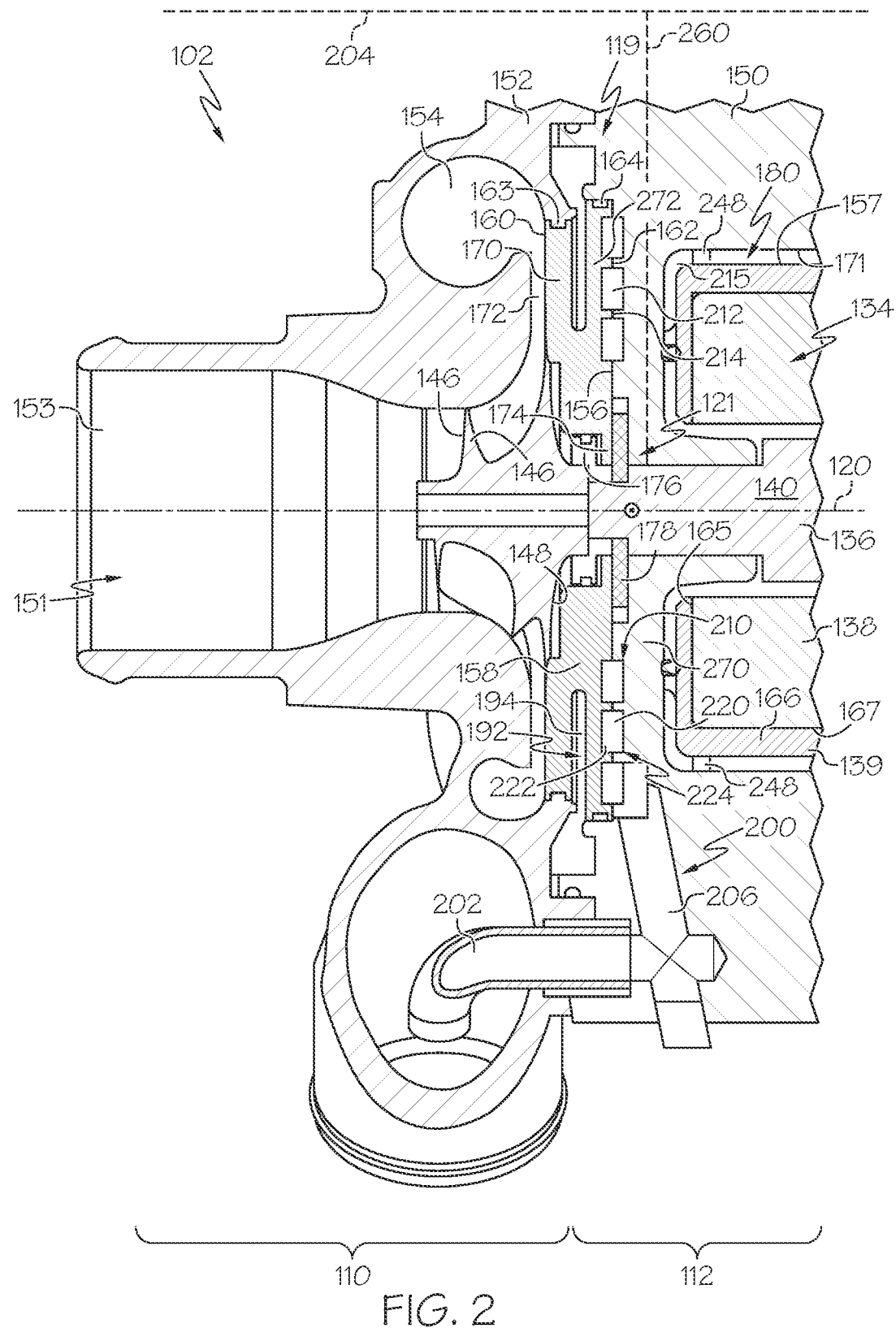
FIG. 2 is a first longitudinal section view of the compressor device of FIG. 1.
Figure 3:
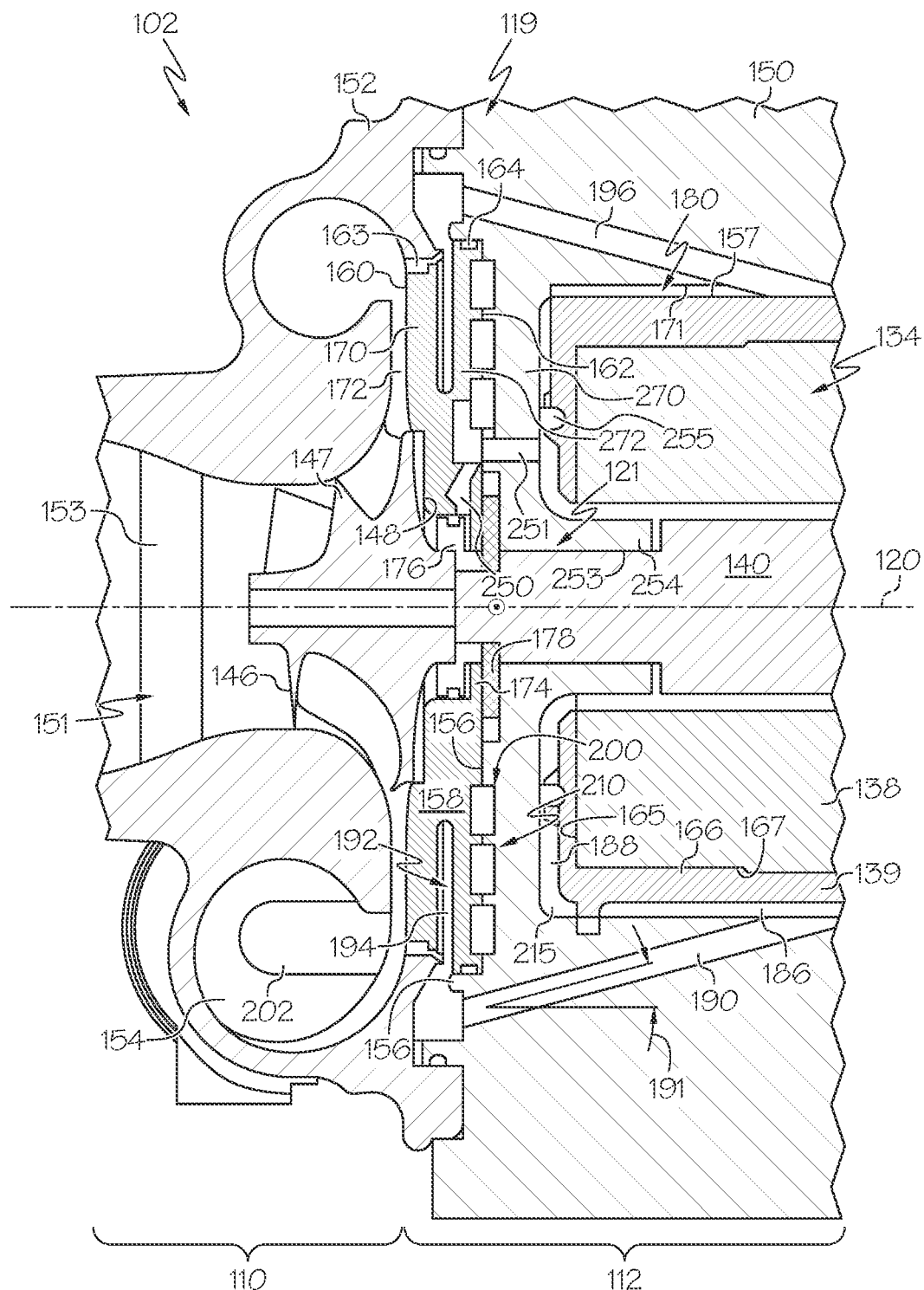
FIG. 3 is a second longitudinal section view of the compressor device of FIG. 1.

As shown in FIGS. 1-3, the compressor device 102 may generally include a rotating group 118 and a housing 119 that houses and encloses the rotating group 118. The rotating group 118 is supported for rotation within the housing 119 about an axis of rotation 120 by one or more bearings 121.

The rotating group 118 may generally include an elongate, cylindrical shaft 140 with a first end 142 and a second end 144. The rotating group 118 may also include a compressor wheel 130 that is fixed to the first end 142 of the shaft 140. The compressor wheel 130 may include a front side 146 with a plurality of blades 147 and an opposite back side 148 that faces toward the second end 144. In some embodiments, the bearing(s) 121 may be configured as a plain bearing, an air bearing, and/or an oil-less bearing.

The compressor device 102 may define a motor section 112. The motor section 112 may include an electric motor 134 that is housed within an outer motor housing 150 of the housing 119. The motor 134 may generally include a rotor 136 and a stator 138 of a known type. The rotor 136 may be mounted on the shaft 140, and the stator 138 may be generally hollow and cylindrical to encircle the rotor 136. The stator 138 may include a number of electrical windings that extend axially along the axis 120, between a first axial end 165 and a second axial end 169.

The rotor 136 and stator 138 may be housed and encased within a thin-walled motor case 139. The motor case 139 may generally conform to the shape of the outer surfaces of the stator 138 so as to be hollow, cylindrical, and centered substantially on the axis 120 with a radial portion 137, a first axial end 135, and a second axial end 131. In some embodiments represented in FIGS. 1, 2, and 3, the motor case 139 may include a sleeve 166 and a cap 168. The sleeve 166 may be cup-shaped and may define the first axial end 135 and at least part of the radial portion 137 of the motor case 139. The sleeve 166 may include an outer surface 157 extending across the first axial end 135 and the radial portion 137. The sleeve 166 may be hollow and configured to receive and cover over the first axial end 165 and a radial face 167 of the stator 138 of the electric motor 134, leaving the second axial end 169 of the stator 138 exposed from the sleeve 166. The cap 168 may be disc-shaped and may be attached and fluidly sealed to the open end of the sleeve 166 to cover the second axial end 169 of the electric motor 134. Also, the cap 168 may define the second axial end 131 of the motor case 139. The cap 168 may also define a part of the radial portion 137 of the motor case 139. The motor case 139 may be made out of a material (e.g., metal) having a high thermal conductivity.

The motor case 139 of the motor 134 may be fixed and supported within the outer motor housing 150 with one or more gaps therebetween. These gaps provide space for flow of a coolant fluid for cooling the motor 134 as will be discussed in more detail below.

The first end 142 and second end 144 of the shaft 140 may extend out respective sides of the motor case 139 and may be supported in the outer motor housing 150 by the bearing 121. Thus, the motor 134 may be operatively attached to the rotating group 118 for driving rotation of the rotating group 118 within the housing 119 about the axis 120.

The compressor device 102 may also include a compressor section 110. The compressor section 110 may include the compressor wheel 130 that is housed within a compressor housing 152 of the housing 119. The compressor wheel 130 may be mounted on the shaft 140, which extends from the compressor wheel 130 to the motor section 112. The compressor housing 152 may define a compressor flow path 151 with a tubular inlet 153 that is centered on the axis 120. The inlet 153 may have a variety of shapes and profiles without departing from the scope of the present disclosure. The flow path 151 of the compressor housing 152 may also define at least part of a volute passage 154 that extends about the axis 120. In some embodiments, the compressor housing 152 may be a unitary (single piece) component that is manufactured via casting operations, via additive manufacturing processes, or otherwise. The compressor housing 152 may be fixedly attached to an axial face 156 of the outer motor housing 150 and may cover over the front side 146 of the compressor wheel 130. The compressor wheel 130 may be driven in rotation by the motor 134 about the axis 120 within the compressor housing 152 of the compressor section 110.

In some embodiments, the compressor device 102 may include an intermediate housing member 158. The intermediate housing member 158 may define portions of the housing 119 as well as portions of the bearing 121 in some embodiments. Thus, the intermediate housing member 158 may be referred to as a "thrust cover" and will be hereafter referred to as such. The thrust cover 158 may be a unitary, one-piece, disc-like part in some embodiments. The thrust cover 158 may include a first axial face 160 and a second axial face 162. The thrust cover 158 may be disposed between and/or at a transition between the compressor section 110 and the motor section 112. The first axial face 160 may face toward the compressor housing 152 and the back side 148 of the compressor wheel 130. A first outer radial edge portion 163 may oppose, engage, and/or fixedly attach to the compressor housing 152, and a second outer radial edge portion 164 may oppose, engage, and/or fixedly attach to the outer motor housing 150. The second axial face 162 may oppose, engage, and/or fixedly attach to the axial face 156 of the outer motor housing 150. As such, a diffuser portion 170 of the thrust cover 158, in cooperation with the compressor housing 152, may define a diffuser area 172 of the compressor device 102 that is disposed outward radially from the outer radial edge of the compressor wheel 130. Further outward, the first axial face 160 of the thrust cover 158 may cooperatively define an inlet into the volute passage 154. Also, the second axial face 162 and other portions of the thrust cover 158 may define one or more fluid passageways, segments, chambers, etc. as will be described in detail below. Furthermore, the thrust cover 158 may include a thrust bearing portion 174 on an inner radial portion thereof for defining and/or supporting the bearing 121. As shown, the thrust bearing portion 174 may be received axially between an annular compressor collar 176 and a thrust disc 178 of the bearing 121.

During operation of the compressor device 102, an inlet airstream (represented by arrows 122 in FIG. 1) may flow into the inlet 153, and the inlet airstream 122 may be compressed as it flows downstream between the compressor wheel 130 and the compressor housing 152, through the diffuser area 172, and into the volute passage 154. A compressed airstream (represented by arrow 124) may exit the volute passage 154 and may be directed to an intercooler 128 and then to the fuel cell stack 104 for boosting the operating efficiency of the fuel cell system 100.

Furthermore, an exhaust gas stream (represented by arrow 132) from the fuel cell stack 104 may be exhausted to atmosphere as represented in FIG. 1. Stated differently, the exhaust gas stream 132 may be directed away from the compressor device 102. Accordingly, the rotating group 118 may be driven in rotation without the need for a turbine. In other words, the rotating group 118 may be turbine-less and may be driven solely by the electric motor 134 in some embodiments. In other embodiments, the exhaust gas stream 132 may be directed back toward the compressor device 102, for example, to drive rotation of a turbine wheel included in the rotating group 118. This may, in turn, drive rotation of the compressor wheel 130, for example, to assist the electric motor 134.

Furthermore, the compressor device 102 may include a motor cooling system 180. Generally, the motor cooling system 180 may provide a first flow of a first fluid (e.g., a liquid coolant) through the housing 119 for cooling the motor 134. The motor cooling system 180, in some embodiments, may also be routed through the housing 119 for cooling the bearing 121 and surrounding structures as will be discussed. The motor cooling system 180 may include an inlet 181 and an outlet 182 (both represented schematically in FIG. 1) and a plurality of passages, chambers, etc. forming one or more continuous fluid paths connecting the inlet 181 and outlet 182.

As shown in FIG. 1, the motor cooling system 180 may include a coolant jacket 184 defined by the gap between the motor case 139 and the outer motor housing 150. The coolant jacket 184 may fluidly connect the inlet 181 and the outlet 182. The inlet 181 may extend through the outer motor housing 150 and may be configured for feeding relatively low-temperature coolant fluid to the coolant jacket 184. Heat may be transferred through the motor case 139 from the electric motor 134 to the coolant within the coolant jacket 184. The coolant jacket 184 may be configured to direct flow of the coolant fluid from the inlet 181 to the outlet 182. The outlet 182 may extend through the outer motor housing 150 and may be configured for receiving the relatively high-temperature coolant from the coolant jacket 184.

The coolant jacket 184 may include a plurality of flow passages configured to distribute flow of the coolant fluid about the motor case 139 to cool the motor 134 therein. In some embodiments, the coolant jacket 184 may be subdivided into an outer diameter portion (i.e., a radial portion 186), a first axial end portion 188, and a second axial end portion 189 that collectively surround and jacket the motor 134. Coolant fluid may be delivered to and circulated through the radial portion 186, the first axial end portion 188, and the second axial end portion 189 during use of the motor cooling system 180.

The radial portion 186 of the coolant jacket 184 may span about the motor case 139 in a circumferential direction and an axial direction with respect to the axis 120. As such, the radial portion 186 may be a cylindrical jacket that covers and extends over the radial portions of the motor case 139 and the underlying stator 138 of the motor 134. A radially-measured gap 159 defining the radial portion 186 between the outer surface 157 of the motor case 139 and an opposing inner radial surface 171 of the outer motor housing 150 is indicated in FIG. 1 as an example. This gap 159 may be maintained along the radial portion 186 for at least part of the axial length of the motor case 139.

The first axial end portion 188 of the coolant jacket 184 may span in a radial direction (e.g., substantially normal to the axis 120) across the first axial end 135 of the motor case 139. As such, the first axial end portion 188 may be a disc-shaped portion of the jacket 184 that covers and extends over the first axial end 135 and the underlying first axial end 165 of the stator 138.

The second axial end portion 189 of the coolant jacket 184 may span in a radial direction (e.g., substantially normal to the axis 120) across the second axial end 131 of the motor case 139. As such, the second axial end 189 may be a disc-shaped portion of the jacket 184 that covers and extends over the second axial end 131 and the underlying second axial end 169 of the stator 138.

At least one of the plurality of flow passages of the coolant jacket 184 may fluidly connect the radial portion 186 to the first axial end portion 188. As represented in FIGS. 1-3, the coolant jacket 184 may include a first junction 215 at the transition between the radial portion and the first axial end portion 188. Likewise, at least one of the plurality of flow passages of the coolant jacket 184 may fluidly connect the radial portion 186 to the second axial end portion 189. As represented in FIGS. 1-3, the coolant jacket 184 may include a second junction 217. The second junction 217 may be a through-hole 229 of the motor case 139 that extends through the cap 168 of the motor case 139 between the radial portion 186 and the second axial end portion 189. As shown in FIG. 1, the through-hole 229 may extend axially through the cap 168. It will be appreciated that the through-hole 229 may extend in a circumferential direction about the axis 120 as well. Various embodiments of the through-hole 229 are discussed in greater detail below.

The motor cooling system 180 may also include at least one fluid boundary, barrier, partition, etc. for dividing the gap between the motor case 139 and the outer motor housing 150. As such, the boundary, barrier, partition, etc. may divide the coolant jacket 184 into a plurality of flow passages. For example, as shown in FIGS. 1, 2, and 3, there may be one or more dams 248 that divide the coolant jacket 184 into the plurality of flow passages. In some embodiments, the dams 248 may be part of the motor case 139. For example, there may at least one dam 248 that projects radially away from the axis 120 from the outer surface 157 of the sleeve 166 and that terminates proximate the inner radial surface 171. In some embodiments, the terminal outer sides of the dams 248 may abut the inner radial surface 171 for supporting the motor case 139 within the outer motor housing 150. It will be appreciated that the dam 248 may be elongate and, in some embodiments, may extend longitudinally along the outer surface 157 and/or other portions of the motor case 139. More specifically, as represented in FIG. 1, the dam 248 may extend in the circumferential direction along the outer surface 157. It will be appreciated also that, in FIG. 1, the dam 248 may be discontinuous in the circumferential direction to maintain the fluid junction 215, thereby allowing flow between the radial portion 186 and the first axial end portion 188 of the coolant jacket 184. Thus, the fluid junction 215 may be provided at predetermined positions and with predetermined dimensions for controlling fluid flow between the radial portion 186b and the first axial portion 188.

Accordingly, the inlet 181 may deliver a flow of coolant fluid to the coolant jacket 184. For example, the inlet 181 may be fluidly connected to the radial portion 186 of the coolant jacket 184. From the radial portion 186, the coolant fluid may be distributed to the first axial portion 188 and the second axial portion 189. As shown in FIG. 1, the outlet 182 may be fluidly connected to the radial portion 186 of the coolant jacket 184; therefore, coolant fluid in the first and second axial portions 188, 189 may return to the radial portion 186 before exiting via the outlet 182.

Thus, coolant may be delivered to both radial and axial portions of the motor 134, thereby providing a large amount of surface-area exposure for cooling the motor 134. In particular, there may be thermal coupling between the stator end turns at the first axial end 165 of the motor 134 and the coolant jacket 184 at the first axial portion 188. Likewise, there may be thermal coupling between the stator end turns at the second axial end 169 of the motor 134 and the coolant jacket 184 at the second axial portion 189. As such, there may be heat flux in the axial direction from the motor 134 to the coolant jacket 184. Also, the radial portion 186 of the coolant jacket 184 may absorb heat transferring outward radially from the motor 134.

The one or more dams 248, the through hole 229, the junction 215, etc. may define the fluid passages of the coolant jacket 184 for directing and distributing the coolant flow to predetermined areas about the motor case 139. The dam(s) 248, the junctions 215, and the through-hole 229 may direct and distribute flow about the motor case 139 (and, thus, about the motor 134), maintaining predetermined flow characteristics (pressure, pressure drop, etc.) of the coolant. Accordingly, the motor cooling system 180 may provide effective and efficient cooling of the motor 134.

Also, the motor cooling system 180 of the present disclosure may be tailored and configured for particular configurations of the compressor device 102. For example, a compressor device 102 expected to run at higher power consumption rates (i.e., more heat energy generated) may include one configuration of the fluid passages about its motor 134 (e.g., the motor case 1139 of FIGS. 8 and 9). Conversely, another compressor device 102 expected to run at lower power consumption rates (i.e., less heat energy generated) may include another configuration of the coolant jacket 184 (e.g. the motor case 2139 of FIGS. 10 and 11). These embodiments of the motor case 1139, 2139 will be discussed in greater detail below.

Moreover, the outer portions of the cap 168 and the dams 248 may abut against the internal surfaces of the outer motor housing 150. This may provide robust structural support and rigidity for the motor case 139, the motor 134, and the rotating group 118.

As shown in FIG. 1, the compressor device 102 may also include one or more sealing members, that create a fluid seal between the motor case 139 and the outer motor housing 150. For example, a first O-ring seal 231 may be included, which encircles and is centered on the axis 120. The O-ring seal 231 may be sealed between the first axial end 135 of the motor case 139 and the outer motor housing 150. A second O-ring seal 233 may also be included, which is sealed between the second axial end 131 of the motor case 139 and the outer motor housing 150.

As shown in FIG. 3, in some embodiments, the motor cooling system 180 may further include a first axial channel 190 that extends through the outer motor housing 150, generally axially from the outer radial portion 186 toward the compressor section 110. The first axial channel 190 may be straight and may have a rounded (circular) cross section (perpendicular to the flow direction). Also, the first axial channel 190 may extend axially to the axial face 156 of the outer motor housing 150 at an angle 191 relative to the axis 120. The first axial channel 190 may be open at the axial face 156, at which the first axial channel 190 fluidly connects and intersects with a radial flow section 192 of the motor cooling system 180.

The radial flow section 192 may be at least partly defined by an annular groove 194 in the thrust cover 158. The groove 194 may be defined between the first and second outer radial edge portions 163, 164 of the thrust cover 158. As such, the groove 194 may extend radially inward from the outer diameter edge of the thrust cover 158. Also, the radial flow section 192 may extend circumferentially about the axis 120. The radial flow section 192 may fluidly connect with a second axial channel 196 (FIG. 3) of the motor cooling system 180. The second axial channel 196 may extend from the axial face 156 and into the outer motor housing 150, generally axially away from compressor section 110 to fluidly connect back with the outer radial portion 186 of the cooling jacket 184. As represented in FIG. 3, the second axial channel 196 may be disposed on an opposite side of the axis 120 from the first axial channel 190 (e.g., spaced 180 degrees apart about the axis 120). Also, the second axial channel 196 may be disposed at an angle (e.g., the inverse of the angle 191 of the first axial channel 190).

Accordingly, the motor cooling system 180 may define one or more fluid flow paths for a first coolant (e.g., a liquid coolant) to flow from the inlet 181 to the outlet 182 in a downstream direction. During operation, the first fluid may flow from the inlet 181 and to the coolant jacket 184. Some of this first fluid in the coolant jacket 184 may branch off from there, and the first fluid may flow through the first axial channel 190 and further downstream into the radial flow section 192. There, the fluid may flow about the axis 120 circumferentially and radially inward toward the axis 120 through the thrust cover 158. Moving even further downstream, the fluid may flow to the second axial channel 196, return to the coolant jacket 184, and then flow to the outlet 182.

Additionally, the compressor device 102 may include a bearing cooling system 200. Generally, the bearing cooling system 200 may provide a second flow of a second fluid (e.g., air or other gas coolant) through the housing 119 for cooling the bearing 121. The bearing cooling system 200 may also be routed through the housing 119 to be disposed in a heat exchanger arrangement with the motor cooling system 180 as will be discussed.

The bearing cooling system 200 may include an inlet 202 and an outlet 204. In some embodiments, the inlet 202 and/or outlet 204 may be in fluid communication with the compressor flow path 151. For example, as shown in FIG. 1, the inlet 202 may be fluidly connected to the compressor flow path 151 (e.g., at the volute passage 154) to receive airflow therefrom, and the outlet 204 may be fluidly connected to return flow back to the compressor flow path 151 (e.g., at the inlet 153). Also, the bearing cooling system 200 may include a plurality of passages, chambers, etc. forming one or more continuous fluid paths connecting the inlet 202 and the outlet 204.

As shown in FIG. 2, the inlet 202 may include a pitot tube (a "reverse" pitot tube) that is disposed within and fluidly connected to the volute passage 154. Also, the bearing cooling system 200 includes one or more bores 206 forming a passage that extends from the axial face 156 and radially inward through the outer motor housing 150.

The bearing cooling system 200 may further include a flow section 210. In some embodiments, the flow section 210 may be cooperatively defined by the second axial face 162 of the thrust cover 158 and the axial face 156 of the outer motor housing 150. For example, the second axial face 162 and/or the axial face 156 may include one or more recesses 212 that is/are defined between one or more walls 214. In the illustrated embodiments, for example, both the axial faces 156, 162 include respective recesses 212 and walls 214 that are aligned axially (i.e., along the axis 120) to define various segments through the flow section 210 of the bearing cooling system 200. Stated differently, as indicated in FIG. 2, the axial face 156 may include a first recess 220 that aligns axially with a second recess 222 of the axial face 162 to cooperatively define a segment 224 of the flow section 210. As shown, there may be a plurality of segments 224 of the flow section 210 defined between the axial faces 156, 162.

As represented in FIGS. 4-7, the segments 224 of the flow section 210 may be arranged together as a continuous flow path. As shown, the segments 224 may have a variety of arrangements without departing from the scope of the present disclosure. A flow path through the flow section 210 as well as the downstream direction of the flow path is indicated in each of the embodiments of FIGS. 4-7 by arrow 226. As shown, the flow path 226 may extend in the downstream direction radially with respect to the axis of rotation 120. More specifically, in some embodiments, the flow path 226 may extend in the downstream direction radially inward with respect to the axis of rotation 120. Also, the flow path 226 of the flow section 210 may extend from one side of the axis of rotation 120 to an opposite side of the axis of rotation 120 as shown in FIGS. 4-7. In some embodiments, the flow path 226 may extend both radially and circumferentially about the axis of rotation 120. The flow path 226 may extend arcuately and/or linearly and straight as it extends in the downstream direction.

Figure 4:
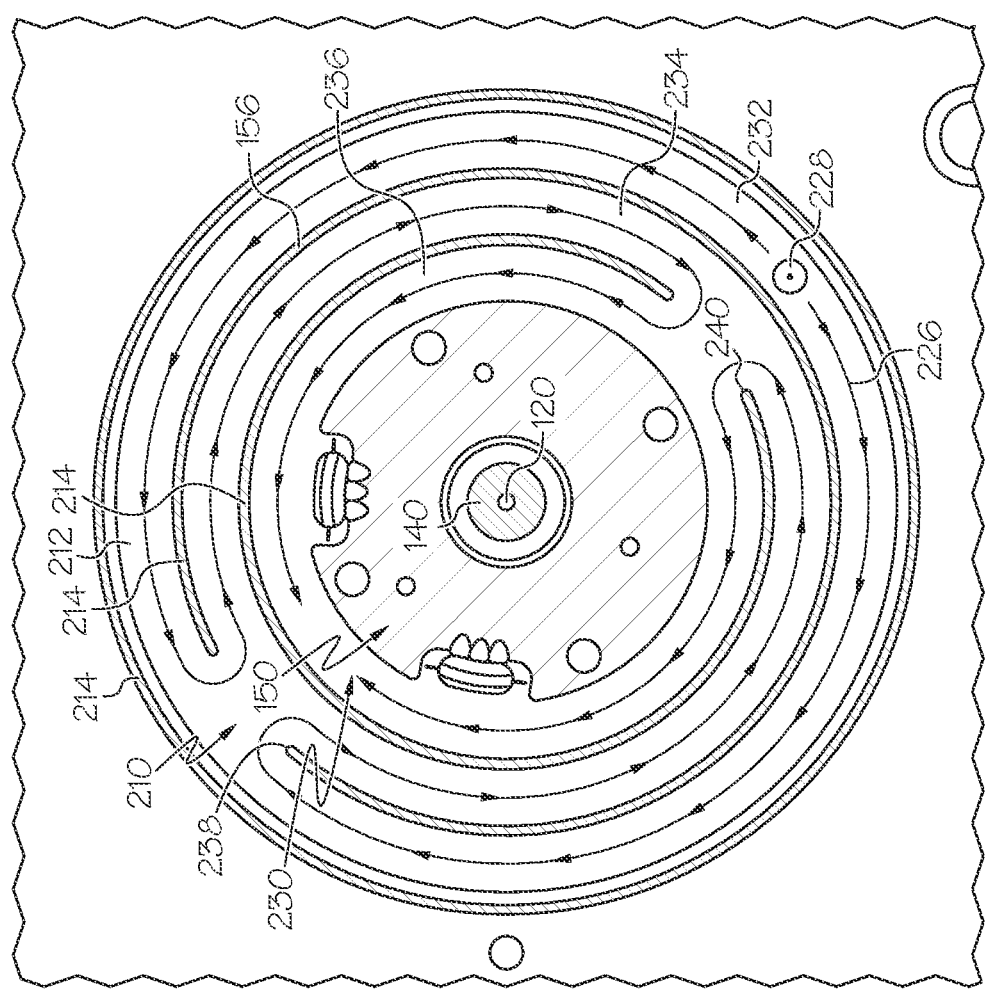
FIG. 4 is an axial section view of the compressor device taken along the line 4-4 of FIG. 1.
Figure 7:
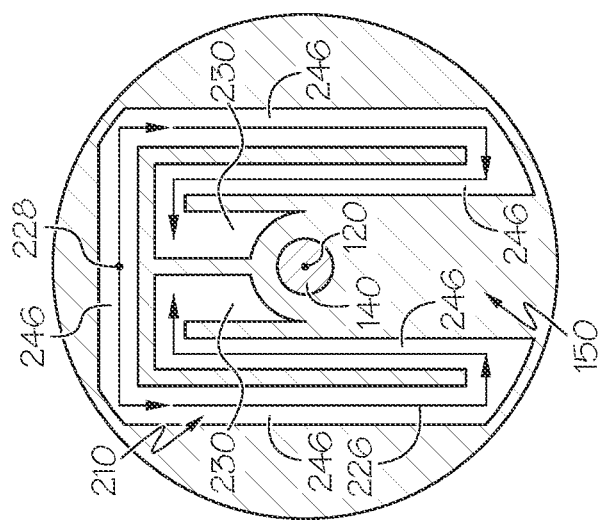
FIG. 7 is an axial section view of the compressor device according to additional example embodiments of the present disclosure.

In particular, in the embodiments of FIG. 4, the flow path 226 through the flow section 210 includes a plurality of arcuate segments, including a first arcuate segment 232, a second arcuate segment 234, and a third arcuate segment 236 that each extend arcuately about the axis 120. The arcuate segments 232, 234, 236 may each have distinct radii and the radius of each may remain substantially constant with respect to the axis of rotation 120. The arcuate segments 232, 234, 236 may be concentric and centered on the axis 120 with the second arcuate segment 234 disposed radially between the first and third arcuate segments 232, 236. Also, there may be a first circumferential gap 238 in one of the walls 214, and the gap 238 may fluidly connect the first and second arcuate segments 232, 234. Likewise, there may be a second circumferential gap 240 in another wall 214, and the gap 240 may fluidly connect the second and third arcuate segments 234, 236. The flow path 226 may have an input area 228 defined within the first (outer) arcuate segment 232, and the flow path 226 may extend downstream along a tortuous path, circumferentially in opposite directions through the first arcuate segment 232, then through the gap 238 radially inward into the second arcuate segment 234, then circumferentially in opposite directions through the second arcuate segment 234, then through the gap 240 radially inward into the third arcuate segment 236, and ultimately to an output area 230 of the flow section 210.

Figure 6:
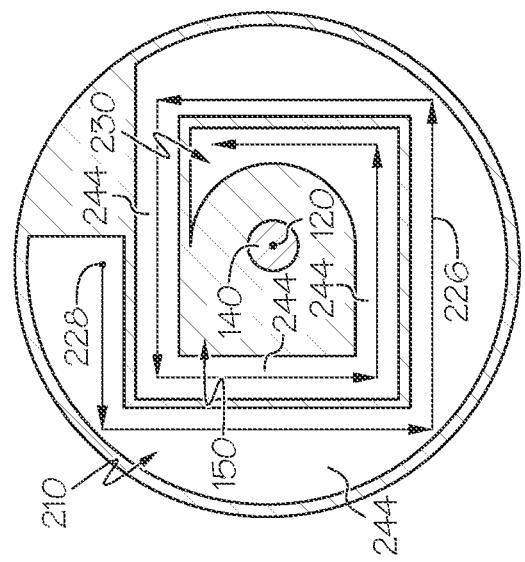
FIG. 6 is an axial section view of the compressor device according to additional example embodiments.
Figure 5:
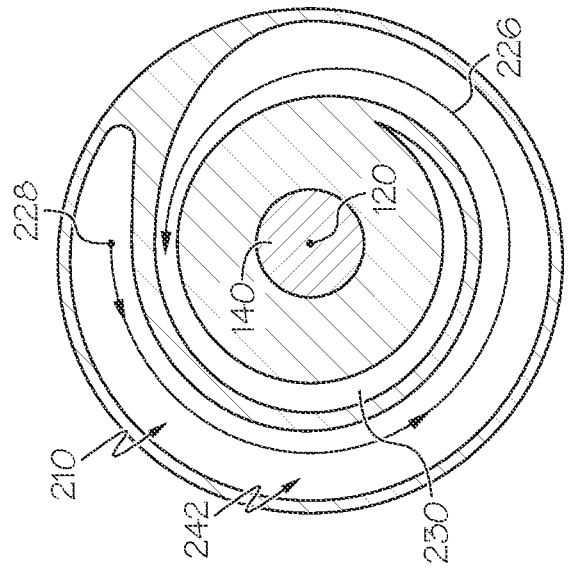
FIG. 5 is an axial section view of the compressor device according to additional example embodiments.

In additional embodiments represented in FIG. 5, the flow section 210 may include an arcuate segment 242 that extends circumferentially and radially inward, spiraling toward the axis 120 from its input area 228 to its output area 230. In further embodiments represented in FIG. 6, the flow section 210 may include a plurality of longitudinally straight segments 244 that are connected end-to-end so as to extend from one side of the axis 120 to the other from its input area 228 to its output area 230. As shown in FIG. 6, the flow path 226 may gradually extend radially inward with respect to the axis 120 (i.e., gradually get closer to the axis 120) as the flow path 226 extends about the axis 120. Moreover, in embodiments represented in FIG. 7, the flow section 210 may include a plurality of longitudinally straight segments 246 that are connected end-to-end so as to extend from one side of the axis 120 to the other and back. As shown, the input area 228 may be on one side and disposed radially outboard. The flow path 226 may split in opposite directions from the input area 228, turn perpendicularly and extend to the opposite side of the axis 120, turn again perpendicularly and extend back to the original side of the axis 120. As shown, the flow path 226 may gradually extend radially inward with respect to the axis 120 (i.e., gradually get closer to the axis 120).

As shown in FIG. 3, the bearing cooling system 200 may further include a first bearing injection path 250 that fluidly connects the output area 230 to thrust and/or journal components of the bearing 121. For example, the first bearing injection path 250 may be a passage extending radially inward through the inner diameter portion of the thrust cover 158 to fluidly connect the output area 230 of the flow section 210 to gaps on one axial side of the thrust disc 178. Thus, fluid (air) from the compressor flow path 151 may be provided via the bearing cooling system 200 to cool the bearing 121. Also, the bearing cooling system 200 may also include a second bearing injection path 251 that fluidly connects the output area 230 to thrust and/or journal components of the bearing 121. For example, the second bearing injection path 251 may include a bore extending axially toward the motor 134 to fluidly connect the output area 230 of the flow section 210 to gaps between the motor case 139 and the outer motor housing 150. (There may be an annular sealing member 255 that seals and separates the liquid coolant in the first axial end portion 188 from the air provided by the second bearing injection path 251.) There may also be an axial path 253 defined between the shaft 140 and an inner radial lip 254 of the outer motor housing 150 that feeds the air from the second bearing injection path 251 to the other axial side of the thrust disc 178. Air in this area may also flow to the journal elements of the bearing 121 as well. Moreover, the bearing cooling system 200 may include features that define a flow path further downstream.

Accordingly, during operation, the inlet 202 of the bearing cooling system 200 may receive air from the compressor flow path 151. This air may flow downstream through the bores 206 (FIG. 2), and to the input area 228 of the flow section 210. The flow may continue radially inward along the flow path 226 of the flow section 210 and may flow to the bearing 121 via the first and second bearing injection paths 250, 251. The air may flow eventually to the outlet 204.

The outlet 204 is represented schematically in FIGS. 1 and 2. As indicated, the outlet 204 may be an elongate passage that is defined through one or more portions of the housing 119 and that extends back to fluidly connect to the inlet 153 of the compressor flow path 151. In some embodiments, the outlet 204 may extend from areas proximate the second end 144 of the shaft 140, through the outer motor housing 150 and/or the compressor housing 152 to fluidly connect to the inlet 153. There may also be a first end outlet branch 260 (FIG. 2). The branch 260 may be a bore extending radially. The branch 260 may extend through the outer motor housing 150, at an axial position between the motor 134 and the axial face 156. The branch 260 may intersect portions of the outlet 204 extending from the second end 144. As such, flow from the branch 260 may return to the inlet 153. Also, in some embodiments, at least part of the outlet 204 may extend along an exterior of the housing 119. Accordingly, the outlet 204 may return the second fluid of the bearing cooling system 200 to the inlet 153 of the compressor flow path 151, upstream of the compressor wheel 130.

The bearing cooling system 200 and the motor cooling system 180 may be disposed together in a heat exchanger arrangement such that heat transfers therebetween. For example, the flow section 210 of the bearing cooling system 200 and the axial end portion 188 of the motor cooling system 180 may be disposed at different axial positions along the axis 120, and heat may be exchanged between the fluids axially (i.e., generally along the axis 120) through an intervening portion 270 of the outer motor housing 150. The flow section 210 and the radial flow section 192 of the motor cooling system 180 may also be disposed at different axial positions along the axis 120, and heat may be exchanged between the fluids axially through an intervening portion 272 of the thrust cover 158. For example, in some embodiments and/or in some operating conditions, the air in the flow section 210 of the bearing cooling system 200 runs hotter than the liquid coolant in the radial flow section 192 and the axial end portion 188 of the motor cooling system 180. Accordingly, the liquid coolant may be a heat sink and may receive heat from the air in the flow section 210 during such operations.

Accordingly, the heat exchanger arrangement of the bearing and motor cooling systems 180, 200 may provide effective cooling for the motor 134 and for the bearing 121. This may ultimately increase operating efficiency of the compressor device 102. These features may also make the compressor device 102 robust for a long operating lifetime of the compressor device 102. Furthermore, the compressor device 102 may be compact and lightweight because of the features discussed above. Additionally, the compressor device 102 of the present disclosure is highly manufacturable with a relatively low part count and convenient assembly process.

Figure 8:
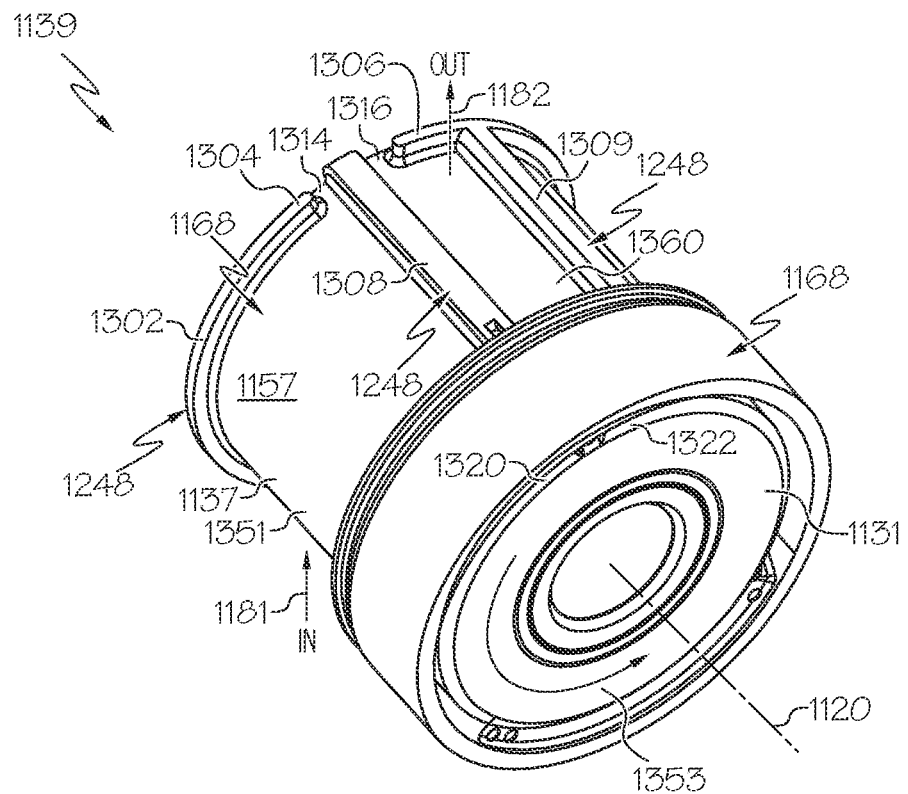
FIG. 8 is a first perspective view of a motor case of the compressor device of FIG. 1 according to additional embodiments.
Figure 9:
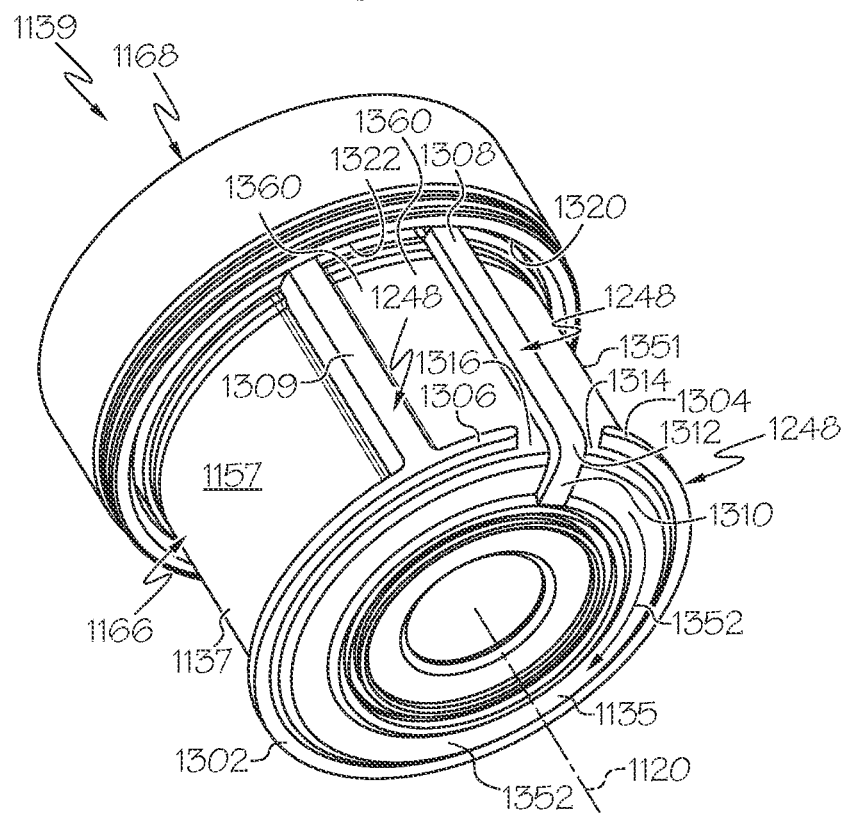
FIG. 9 is a second perspective view of the motor case of FIG. 8.

Referring now to FIGS. 8 and 9, the motor case 1139 will be discussed according to additional embodiments. The motor case 1139 may include a number of the features discussed above with respect to the motor case 139 of FIGS. 1-3. Components that correspond to those of the motor case 139 of FIGS. 1-3 are indicated with corresponding reference numbers increased by 1000.

The motor case 1139 may include the sleeve 1166 and cap 1168, which cooperate to encase the electric motor therein. The sleeve 1166 may also include a plurality of dams 1248, such as an elongate circumferential dam 1302 that extends circumferentially about the sleeve 1166, proximate the first axial end 1135. The circumferential dam 1302 may project outward radially from the outer surface 1157 (toward the outer motor housing 150 of FIG. 1). The circumferential dam 1302 may include a first longitudinal end 1304 and a second longitudinal end 1306, which are spaced apart at a distance in the circumferential direction.

The plurality of dams 1248 may further include a first axial dam 1308. The first axial dam 1308 may extend along the axis 1120 (e.g., substantially parallel to the axis 1120). The first axial dam 1308 may also project outwardly radially from the outer surface 1157 of the sleeve 1166 (toward the outer motor housing 150 of FIG. 1).

The plurality of dams 1248 may additionally include a radial dam 1310 (FIG. 9) that extends radially along the first axial end 1135 of the motor case 1139. The axis of the radial dam 1310 may intersect the axis 120. The radial dam 1310 may project outward axially from the first axial end 1135 (toward the outer motor housing 150 of FIG. 1). The radial dam 1310 may intersect the first axial dam 1308 at a dam segment 1312. This segment 1312 may be disposed circumferentially between the first and second longitudinal ends 1304, 1306 of the circumferential dam 1302. As such, this area of the motor case 1139 may define a first opening 1314 circumferentially between the first longitudinal end 1304 of the dam 1302 and the dam segment 1312. Also, the motor case may define part a second opening 1316 circumferentially between the second longitudinal end 1306 of the dam 1302 and the dam segment 1312. When the motor case 1139 is disposed in the outer motor housing 150 (FIG. 1), the openings 1314, 1316 may provide fluid junctions between the radial portion 186 and the first axial portion 188 of the coolant jacket 184.

The motor case 1139 may further include a second axial dam 1309. The second axial dam 1309 may extend along the axis 1120 (e.g., substantially parallel thereto). The second axial dam 1309 may be spaced apart in the circumferential direction from the first axial dam 1308.

The cap 1168 of the motor case 1139 (FIGS. 8 and 9) may include a first through-hole 1320 and a second through-hole 1322. The through-holes 1320, 1322 may extend axially through the cap 1168, similar to the embodiments of the through-hole 229 FIGS. 1-3. The through-holes 1320, 1322 may be spaced apart angularly about the cap 1168. When the motor case 1139 is disposed in the outer motor housing 150 (FIG. 1), the through-holes 1320, 1322 may provide fluid junctions between the radial portion 186 and the second axial portion 189 of the coolant jacket 184.

It is understood that the motor case 1139 may be disposed in the outer motor housing 150 (FIG. 1) to cooperatively define the coolant jacket 184. The inlet 1181 to the coolant jacket is indicated relative to the motor case 1139 in FIG. 8. The outlet 1183 is also indicated. The inlet 1181 and/or outlet 1183 may be arranged similar to the embodiments of FIG. 1, or may be configured differently without departing from the scope of the present disclosure. Although the outer motor housing 150 is hidden in FIGS. 8 and 9, a plurality of flow passages for the coolant will be discussed. It will be appreciated that the inner surface 171 (FIG. 1) of the outer motor housing 150 may be smooth and the dams 1248 and the radial portions of the cap 1168 may abut against the inner surface 171. As mentioned above, the coolant jacket 184 may, thus, be defined in the gaps between the motor case 1139 and the inner surface 171 with the dams 1248, through-holes in the cap 1168, fluid junctions, etc. directing flow through the coolant jacket 184.

During operation, the coolant fluid may be received from the inlet 1181 and into a circumferential flow passage 1351 (defined in the circumferential direction between the first and second axial dams 1308, 1309 and in the axial direction between the dam 1302 and the cap 1168). The coolant flow may diverge and flow circumferentially in both directions within the circumferential flow passage 1351. In one circumferential direction, the coolant flow may turn axially and flow through the first opening 1314 and into a first arcuate flow passage (indicated by arrow 1352 in FIG. 9) at the first axial end 1135 of the motor case 1139. In the other circumferential direction, the coolant may flow toward the second axial dam 1309. Flow may further diverge from the circumferential flow passage 1351 and may turn axially to flow through the first through-hole 1320 to a second arcuate flow passage 1353 at the second axial end 1131.

As indicated in FIG. 8, flow in the first arcuate flow passage 1352 may be directed circumferentially along the first axial end 1135 of the motor case 1139 from the first opening 1314 to the second opening 1316. Coolant in the second arcuate flow passage 1353 (FIG. 9) may flow circumferentially from the first through-hole 1320 to the second through-hole 1322. Flows from the second opening 1316 and the second through-hole 1322 may flow from the opposite axial ends 1132, 1131 and may converge within an axial flow passage 1360. The axial flow passage 1360 may extend along the axis 1120 and may be defined by the first axial dam 1308 and the second axial dam 1309. These converging coolant flows may flow axially within the axial flow passage 1360 and then exit the coolant jacket via the outlet 1182.

Figure 10:
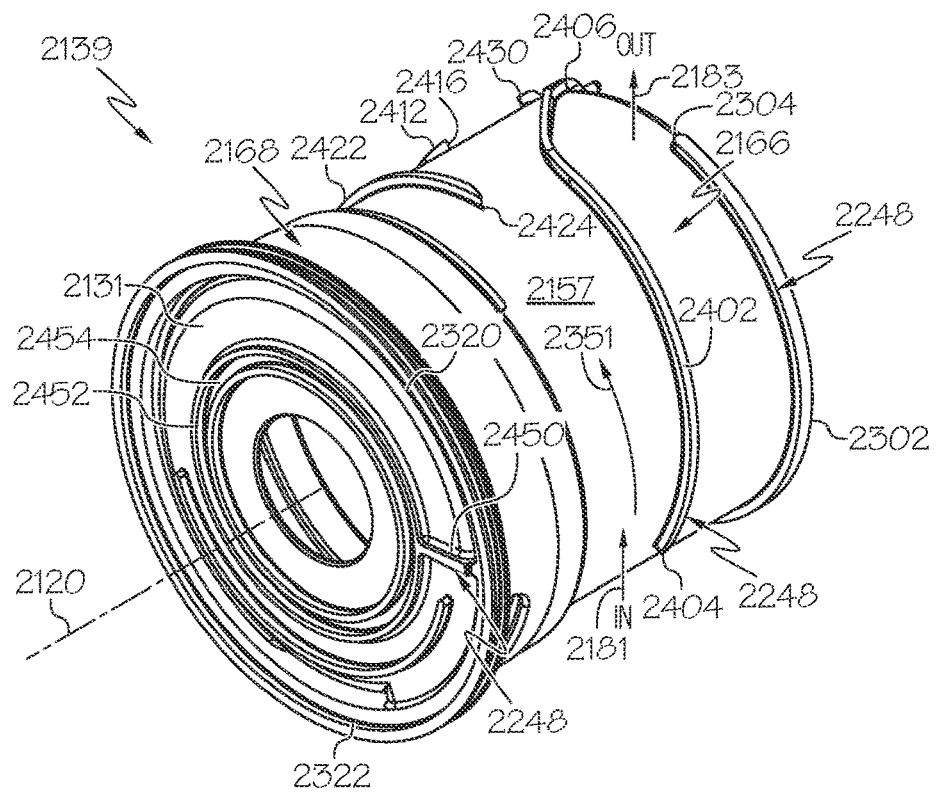
FIG. 10 is a first perspective view of another motor case of the compressor device of FIG. 1 according to additional embodiments.
Figure 11:
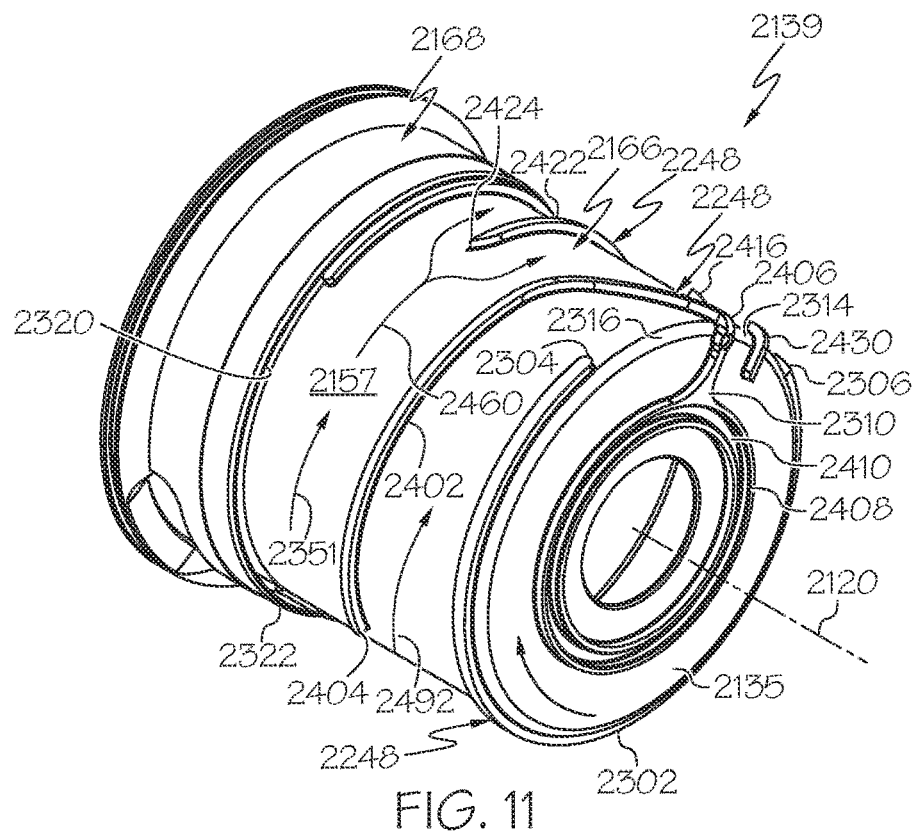
FIG. 11 is a second perspective view of the motor case of FIG. 10.
Figure 12:
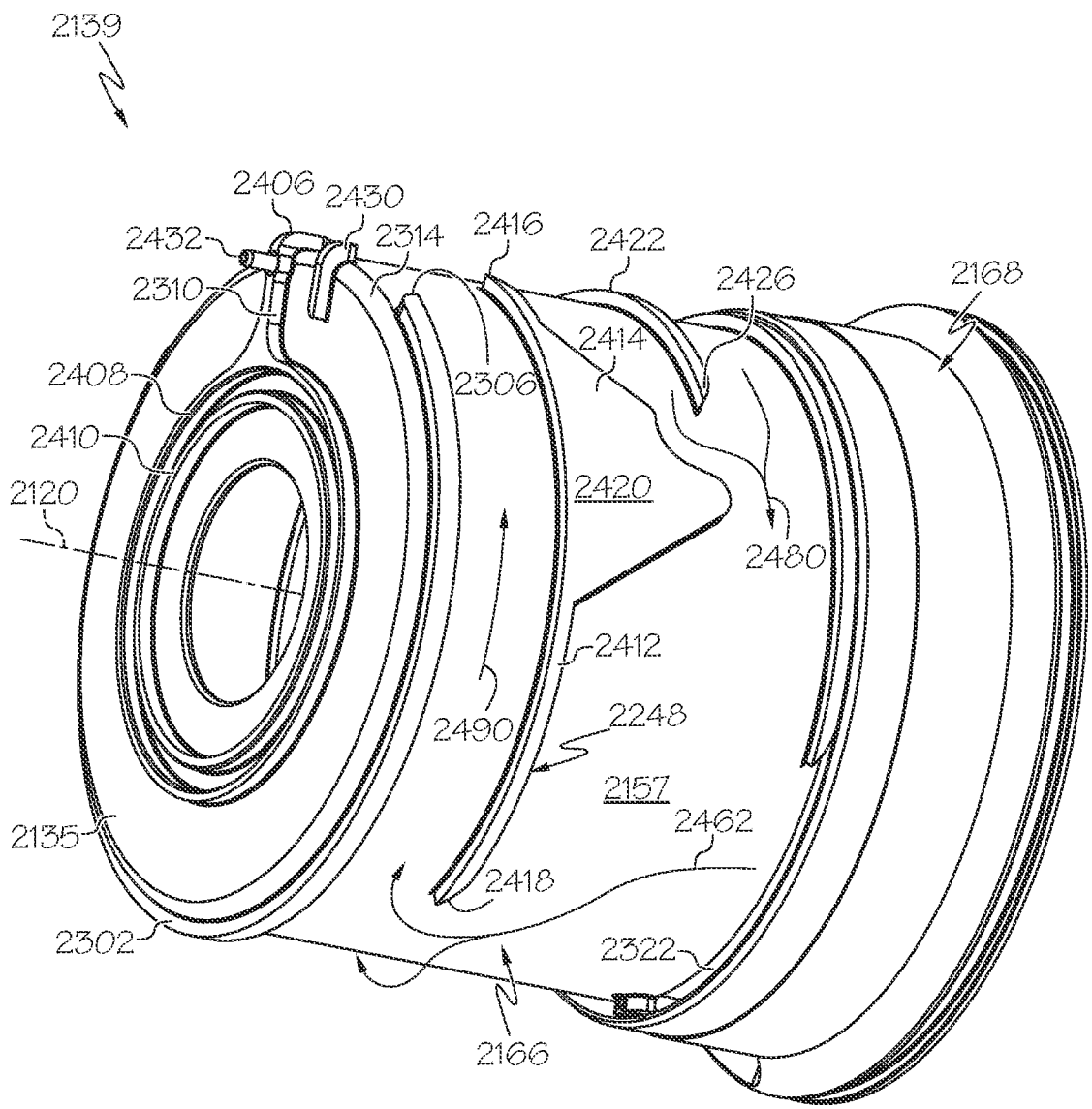
FIG. 12 is a third perspective view of the motor case of FIG. 10.

Referring now to FIGS. 10-12, additional embodiments of the motor case 2139 will be discussed according to additional embodiments. The motor case 2139 may include a number of the features discussed above with respect to the motor case 1139 of FIGS. 8 and 9. Components of the motor case 2139 that correspond to those of the motor case 1139 of FIGS. 8 and 9 are indicated with corresponding reference numbers increased by 1000.

The motor case 2139 may include the sleeve 2166 and cap 2168, which cooperate to encase the motor. The sleeve 2166 may also include a plurality of dams 2248. The dams 2248 of the motor case 2139 may include a first circumferential dam 2302 that extends circumferentially about the sleeve 2166, proximate the first axial end 2135. The circumferential dam 2302 may project outward radially from the outer surface 2157 (toward the outer motor housing 150 of FIG. 1). The circumferential dam 2302 may include a first longitudinal end 2304 and a second longitudinal end 2306, which are spaced apart at a distance in the circumferential direction.

The plurality of dams 2248 may further include a first serpentine dam 2402. This dam 2402 may extend in a circumferential direction about the outer surface 2157 with respect to the axis 2120. The first serpentine dam 2402 may also include at least one segment along its length that extends helically with respect to the axis 2120. As such, the dam 2402 may include a first longitudinal end 2404 and a second longitudinal end 2406, which may be spaced apart in both the circumferential direction and the axial direction with respect to the axis 2120. The second longitudinal end 2406 may be disposed circumferentially between the first longitudinal end 2304 and the second longitudinal end 2306 of the circumferential dam 2302.

The plurality of dams 2248 may further include a second circumferential dam 2412 (FIG. 12). This dam 2412 may extend in a circumferential direction about the outer surface 2157 with respect to the axis 2120. As such, the dam 2412 may include a first longitudinal end 2416 and a second longitudinal end 2418, which may be spaced apart in the circumferential direction with respect to the axis 2120.

A flow diverter pad 2414 may be included, which may connect with the second circumferential dam 2412. The pad 2414 may be wedge shaped and may be shaped to divert or converge flow within the coolant jacket as will be discussed. As shown in FIG. 12, the pad 2414 may be tapered and wedge shaped so as to be directed toward the cap 2168. Also, the pad 2414 may provide a contoured surface 2420 with relatively large surface area that may abut against the outer motor housing 150 (FIG. 1) for supporting the motor case 2139 therein.

The plurality of dams 2248 may further include a third circumferential dam 2422. The third circumferential dam 2422 may extend in the circumferential direction about the outer surface 2157 with respect to the axis 2120. As such, the dam 2422 may include a first longitudinal end 2424 (FIGS. 10 and 11) and a second longitudinal end 2426 (FIG. 12). The third circumferential dam 242 may be disposed axially between the second circumferential dam 2412 and the cap 2168 on the outer surface 2157.

The plurality of dams 2248 may also include a radial dam 2310 (FIGS. 11 and 12) that extends radially along the first axial end 2135 of the motor case 1139. The axis of the radial dam 2310 may intersect the axis 2120. The radial dam 2310 may project outward axially from the first axial end 2135 (toward the outer motor housing 150 of FIG. 1). The radial dam 2310 may intersect the second longitudinal end 2406 of the serpentine dam 2402. The radial dam 2310 may further intersect an annular dam 2408 centered about the axis 2120. The annular dam 2408 may also include a groove 2410 for receiving the O-ring seal (such as the seal 231 of FIG. 1).

The radial dam 2310 may be disposed circumferentially between the first and second longitudinal ends 2304, 2306 of the circumferential dam 2302. As such, the motor case 2139 may define a first opening 2314 circumferentially between the second longitudinal end 2306 of the dam 2302 and the radial dam 2310. Moreover, the motor case 2139 may define a second opening 2316 circumferentially between the first longitudinal end 2304 and the radial dam 2310. Also, the motor case 2139 may include a flow directing vane 2430. The vane 2430 may be a relatively short dam and may be disposed within the first opening 2314. The vane 2430 may aid in directing the flow through the first opening 2314. When the motor case 2139 is disposed in the outer motor housing 150 (FIG. 1), the openings 2314, 2316 may provide fluid junctions between the radial portion 186 and the first axial portion 188 of the coolant jacket 184.

Furthermore, the motor case 2139 may include one or more anti-rotation projections 2432 (FIG. 12). The projection 2432 may be a pin that projects axially from the first radial dam 2310. The projection 2432 may be received in a corresponding aperture within the outer motor housing 150 (FIG. 1) to retain the motor case 2139 in a fixed angular orientation relative to the outer motor housing 150. There may be one or more additional anti-rotation features as well.

The cap 2168 may include a second radial dam 2450 (FIG. 10). The second radial dam 2450 may extend radially on the second axial end 2131 from the outer radial edge of the cap 2168. The second radial dam 2450 may further intersect an annular dam 2452 that is centered about the axis 2120 on the second axial end 2131. The annular dam 2452 may also include a groove 2454 for receiving the O-ring seal (such as the seal 233 of FIG. 1).

The cap 2168 may additionally include a first through-hole 2320 and a second through-hole 2322. The through-hole 2320 may extend axially through the cap 2168 to fluidly connect the radial portion 186 and second axial portion 189 of the coolant jacket 184. The through-holes 2320, 2322 may be spaced apart circumferentially and may be disposed on opposite sides of the second radial dam 2450.

During operation, the coolant fluid may be received from the inlet 2181 and into a first circumferential flow passage (defined by arrow 2351 in FIGS. 10 and 11). This flow may diverge into multiple distinct flow passages, for example, with: (a) a portion splitting at the first longitudinal end 2424 of the third circumferential dam 2422 as indicated by arrow 2460; and (b) another portion diverted to the second axial end 2131 via the first through-hole 2320. At the second axial end 2131, the coolant fluid may flow circumferentially toward the second through-hole 2322 to flow in a generally axial direction through a bottom side axial flow channel (represented by arrow 2462 in FIG. 12). The flow axis of the axial flow channel 2462 may be curved but may generally extend axially from the cap 2168 and toward the first axial end 2135.

Moreover, as shown in FIGS. 10 and 11, part of the flow diverted by the longitudinal end 2424 may flow circumferentially on respective sides of the dam 2422. Further downstream, these flows may re-converge (as represented by arrow 2480 in FIG. 12). As shown, one part of this flow may be directed by the flow diverter pad 2414 (FIG. 12) toward the convergence 2480. Even further downstream, this flow may re-join the flow entering the bottom side axial flow channel 2462 from the second through-hole 2322. Further downstream, the bottom side axial flow channel 2462 may diverge in opposite circumferential directions, proximate the first axial end 2135. In one circumferential direction, the coolant fluid may flow in a circumferential flow passage 2490 between the first and second circumferential dams 2302, 2412 toward the first opening 2314. In the other circumferential direction, the coolant fluid may flow in a serpentine flow passage 2492 (e.g., a helical flow passage) between the serpentine dam 2402 and the circumferential dam 2302 toward the outlet 2183. At the first opening 2314, the coolant fluid may flow circumferentially toward the second opening 2316 and the outlet 2183.

Thus, the motor case 113, 1139, 2139 may have a variety of configurations for controlling the flow of coolant through the coolant jacket. Accordingly, the motor cooling system may provide effective and efficient motor cooling for higher performance of the compressor device. Also, the motor cooling system may be provided in a compact package. The motor cooling system may also provide manufacturing efficiencies and/or other benefits as well.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A compressor device comprising: a compressor section with a compressor wheel; a motor section with an electric motor having a motor axial end and a motor radial face, the electric motor being received within by a motor case, the motor case including a radial portion that covers the motor radial face and an axial end that covers the motor axial end, the motor section including an outer motor housing, the motor case supported within the outer motor housing with the outer motor housing covering the radial portion of the motor case and the axial end of the motor case and a gap defined between the motor case and the outer motor housing; a shaft that extends between the compressor wheel and the motor section, the shaft configured to be driven in rotation about an axis by the electric motor to drivingly rotate the compressor wheel within the compressor section; a motor cooling system with an inlet extending through the outer motor housing, an outlet extending through the outer motor housing, and a coolant jacket defined in the gap between the motor case and the outer motor housing to jacket the motor case and the electric motor therein, the inlet configured to feed a coolant fluid to the coolant jacket, the outlet configured to receive the coolant fluid from the coolant jacket; the coolant jacket configured to direct flow of the coolant fluid from the inlet to the outlet, the coolant jacket including a plurality of flow passages configured to distribute flow of the coolant fluid about the motor case, the plurality of flow passages defining at least one diverging flow path and at least one converging flow path; and the coolant jacket including a radial portion that spans about the motor case in a circumferential direction and an axial direction with respect to the axis, the coolant jacket including an axial portion that spans in a radial direction across the an axial end of the motor case, at least one of the plurality of flow passages fluidly connecting the radial portion of the coolant jacket and the axial portion of the coolant jacket.

2. The compressor device of claim 1, wherein the motor case includes a dam that projects outward therefrom, the dam dividing the coolant jacket into two of the plurality of flow passages.

3. The compressor device of claim 2, wherein the dam extends in a helical direction on the motor case with respect to the axis.

4. The compressor device of claim 1, wherein the plurality of flow passages includes a circumferential flow passage that extends in the circumferential direction about the axis.

5. The compressor device of claim 4, wherein the motor case includes an end dam that projects outward from the axial end of the motor case, the end dam disposed in the axial portion of the coolant jacket and dividing the axial portion of the coolant jacket, the end dam partly defining the circumferential flow passage in the axial portion of the coolant jacket.

6. The compressor device of claim 4, wherein the circumferential flow passage is included in the radial portion of the coolant jacket.

7. The compressor device of claim 1, wherein the plurality of flow passages includes an axial flow passage that extends in the axial direction along the axis.

8. The compressor device of claim 1, wherein the plurality of flow passages includes a helical flow passage that extends in a helical direction about the axis.

9. The compressor device of claim 1, wherein the at least one of the plurality of flow passages fluidly connecting the radial portion of the coolant jacket and the axial portion of the coolant jacket is a through-hole extending through the motor case.

10. The compressor device of claim 1, wherein the motor case includes a dam that projects outward therefrom, wherein the dam includes a first longitudinal end and a second longitudinal end that are separated by an opening junction; and wherein the opening junction at least partly defines the at least one of the plurality of flow passages fluidly connecting the radial portion of the coolant jacket and the axial portion of the coolant jacket.

11. The compressor device of claim 1, wherein the axial end of the motor case is comprised of a first axial end and a second axial end, the axial portion of the coolant jacket is a first axial end portion that spans in the radial direction across the first axial end of the motor case; wherein the coolant jacket includes a second axial end portion that spans in the radial direction across the second axial end of the motor case; wherein the plurality of flow passages includes a first junction that fluidly connects the radial portion of the coolant jacket and the first axial end portion, and wherein the plurality of flow passages includes a second junction that fluidly connects the radial portion of the coolant jacket and the second axial end portion.

12. The compressor device of claim 1,
wherein the motor axial end is a first motor axial end and wherein the electric motor has a second motor axial end that are separated along the axis, wherein the motor case includes a sleeve that receives the first motor axial end and the motor radial face, leaving the second motor axial end exposed axially from the sleeve;
wherein the motor case includes a cap that is attached to the sleeve to cover the second motor axial end of the electric motor.

13. A method of manufacturing a compressor device comprising: providing a compressor section of the compressor device with a compressor wheel; encasing an electric motor in a motor case of a motor section, the electric motor having a motor axial end and a motor radial face, the electric motor being received within the motor case, the motor case including a radial portion that covers the motor radial face and an axial end that covers the motor axial end; supporting the motor case within an outer motor housing with the outer motor housing covering the radial portion of the motor case and the axial end of the motor case and a gap defined between the motor case and the outer motor housing;

extending a shaft between the compressor wheel and the motor section, the shaft configured to be driven in rotation about an axis by the electric motor to drivingly rotate the compressor wheel within the compressor section; and defining a coolant jacket of a motor cooling system between the motor case and the outer motor housing to jacket the motor case and the electric motor therein, the motor cooling system having an inlet and an outlet that extend through the outer motor housing, the inlet configured to feed a coolant fluid to the coolant jacket, the outlet configured to receive the coolant fluid from the coolant jacket; the coolant jacket configured to direct flow of the coolant fluid from the inlet to the outlet, the coolant jacket including a plurality of flow passages configured to distribute flow of the coolant fluid about the motor case, the plurality of flow passages defining at least one diverging flow path and at least one converging flow path; and the coolant jacket including a radial portion that spans about the motor case in a circumferential direction and an axial direction with respect to the axis, the coolant jacket including an axial portion that spans in a radial direction across the axial end of the motor case, at least one of the plurality of flow passages fluidly connecting the radial portion of the coolant jacket and the axial portion of the coolant jacket.

14. A compressor device comprising: a compressor section with a compressor wheel; a motor section with an electric motor having a motor axial end and a motor radial face, the electric motor being received within a motor case, the motor case including a radial portion that covers the motor radial face and an axial end that covers the motor axial end, the motor section including an outer motor housing, the motor case supported within the outer motor housing with the outer motor housing covering the radial portion of the motor case and the axial end of the motor case and a gap defined between the motor case and the outer motor housing, the motor case including a plurality of dams that project outward toward the outer motor housing; a shaft that extends between the compressor wheel and the motor section, the shaft configured to be driven in rotation about an axis by the electric motor to drivingly rotate the compressor wheel within the compressor section; a motor cooling system with an inlet extending through the outer housing, an outlet extending through the outer motor housing, and a coolant jacket defined in the gap between the motor case and the outer motor housing to jacket the motor case and the electric motor therein, the inlet configured to feed a coolant fluid to the coolant jacket, the outlet configured to receive the coolant fluid from the coolant jacket; the coolant jacket configured to direct flow of the coolant fluid from the inlet to the outlet, the plurality of dams dividing the coolant jacket into a plurality of flow passages, the plurality of flow passages configured to distribute flow of the coolant fluid about the motor case, the plurality of flow passages defining at least one diverging flow path and at least one converging flow path; the coolant jacket including a radial portion that spans about the motor case in a circumferential direction and an axial direction with respect to the axis, the coolant jacket including an axial portion that spans in a radial direction across an axial end of the motor case; and the motor case including a through-hole that fluidly connects the radial portion of the coolant jacket and the axial portion of the coolant jacket, the plurality of dams including an end dam that divides the axial portion of the coolant jacket.

15. The compressor device of claim 14, wherein at least one of the plurality of dams extends in a helical direction on the motor case with respect to the axis.

16. The compressor device of claim 14, wherein the plurality of flow passages includes a circumferential flow passage that extends in the circumferential direction about the axis.

17. The compressor device of claim 16, wherein the end dam partly defines the circumferential flow passage in the axial portion of the coolant jacket.

18. The compressor device of claim 16, wherein the circumferential flow passage is included in the radial portion of the coolant jacket.

19. The compressor device of claim 14, wherein the plurality of flow passages includes an axial flow passage that extends in the axial direction along the axis.

20. The compressor device of claim 14, wherein the plurality of flow passages includes a helical flow passage that extends in a helical direction about the axis.

* * * * *